(12) United States Patent
Diab et al.

(10) Patent No.: US 8,395,478 B2
(45) Date of Patent: Mar. 12, 2013

(54) SECURE PROFILE SETTING IN A SHARED DEVICE

(75) Inventors: Wael W. Diab, San Francisco, CA (US); Mohammad Issa, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 1076 days.

(21) Appl. No.: 11/590,204

(22) Filed: Oct. 30, 2006

(65) Prior Publication Data

US 2008/0100414 A1  May 1, 2008

(51) Int. Cl.
*G05B 19/00* (2006.01)

(52) U.S. Cl. ............ 340/5.81; 340/10.4; 340/5.82; 340/13.26; 379/90.01; 379/88.17

(58) Field of Classification Search .......... 340/10.1, 340/10.2, 10.3, 10.4, 10.41, 10.42, 5.52, 340/5.1, 5.53, 5.8, 5.83, 5.84, 5.85, 825.37, 340/13.26, 5.81; 455/456.1–456.3; 379/90.01, 379/91.02, 88.17
See application file for complete search history.

(56) References Cited

U.S. PATENT DOCUMENTS

| | | | | |
|---|---|---|---|---|
| 6,041,410 A * | 3/2000 | Hsu et al. | ...... | 713/186 |
| 6,078,265 A * | 6/2000 | Bonder et al. | ...... | 340/5.23 |
| 6,473,751 B1 * | 10/2002 | Nikolovska et al. | ...... | 1/1 |
| 6,505,780 B1 * | 1/2003 | Yassin et al. | ...... | 235/492 |
| 6,542,515 B1 * | 4/2003 | Kumar et al. | ...... | 370/463 |
| 6,600,418 B2 * | 7/2003 | Francis et al. | ...... | 340/572.1 |
| 6,609,656 B1 * | 8/2003 | Elledge | ...... | 235/382 |
| 6,870,909 B2 * | 3/2005 | Gross et al. | ...... | 379/88.22 |
| 6,961,000 B2 * | 11/2005 | Chung | ...... | 340/572.1 |
| 7,081,028 B1 * | 7/2006 | Crane | ...... | 440/84 |
| 7,219,123 B1 * | 5/2007 | Fiechter et al. | ...... | 709/203 |
| 7,274,931 B2 * | 9/2007 | Harris | ...... | 455/419 |
| 7,356,394 B2 * | 4/2008 | Burgess | ...... | 701/29.3 |
| 7,376,740 B1 * | 5/2008 | Porter et al. | ...... | 709/227 |
| 7,471,199 B2 * | 12/2008 | Zimmerman et al. | ...... | 340/572.1 |
| 7,493,082 B2 * | 2/2009 | Perttila | ...... | 455/41.2 |
| 7,495,544 B2 * | 2/2009 | Stilp | ...... | 340/10.1 |
| 7,506,818 B2 * | 3/2009 | Beenau et al. | ...... | 235/487 |
| 7,526,111 B2 * | 4/2009 | Miura et al. | ...... | 382/126 |
| 7,624,417 B2 * | 11/2009 | Dua | ...... | 725/114 |
| 7,747,797 B2 * | 6/2010 | Abraham et al. | ...... | 710/62 |
| 7,870,202 B2 * | 1/2011 | Madams et al. | ...... | 709/206 |
| 7,920,065 B2 * | 4/2011 | Light et al. | ...... | 340/573.1 |
| 7,956,730 B2 * | 6/2011 | White et al. | ...... | 340/426.2 |
| 7,965,821 B2 * | 6/2011 | Bouchard et al. | ...... | 379/68 |
| 2004/0107108 A1 * | 6/2004 | Rohwer | ...... | 704/275 |
| 2005/0174975 A1 * | 8/2005 | Mgrdechian et al. | ...... | 370/338 |
| 2006/0066148 A1 * | 3/2006 | Nguyen | ...... | 307/10.2 |
| 2006/0085419 A1 * | 4/2006 | Rosen | ...... | 707/9 |
| 2006/0170530 A1 * | 8/2006 | Nwosu et al. | ...... | 340/5.53 |
| 2006/0234769 A1 * | 10/2006 | Srinivasan et al. | ...... | 455/556.1 |
| 2007/0008130 A1 * | 1/2007 | Ashwood Smith | ...... | 340/572.1 |

(Continued)

*Primary Examiner* — Jennifer Mehmood
*Assistant Examiner* — Rufus Point
(74) *Attorney, Agent, or Firm* — Farjami & Farjami LLP

(57) ABSTRACT

There is provided a system for secure profile setting that includes at least one shared device and an RFID reader module embedded in the at least one shared device. The system further includes a database that is in communication with the at least one shared device. In the system, an RFID transponder module associated with a user transmits a signal that enables the at least one shared device to identify the user. The RFID transponder module can include a fingerprint scanner module, which can be used to acquire a user's fingerprint data to authenticate the user. Thus, after identifying the user, the at least one shared device retrieves a profile corresponding to the user from the database and sets the profile.

14 Claims, 4 Drawing Sheets

U.S. PATENT DOCUMENTS

| | | | |
|---|---|---|---|
| 2007/0018785 A1* | 1/2007 | Chi | 340/5.2 |
| 2007/0066221 A1* | 3/2007 | Shim et al. | 455/41.2 |
| 2007/0250591 A1* | 10/2007 | Milic-Frayling et al. | 709/217 |
| 2007/0298776 A1* | 12/2007 | Arlene | 455/419 |
| 2008/0010674 A1* | 1/2008 | Lee | 726/7 |
| 2008/0106390 A1* | 5/2008 | White | 340/426.11 |

* cited by examiner

SECURE PROFILE SETTING IN A SHARED DEVICE

BACKGROUND OF THE INVENTION

1. Field of the Invention

The present invention relates generally to electronic systems. More particularly, the present invention relates to configuring electronic systems.

2. Background Art

A shared device which can be used by any one of a number of authorized users, such as a Voice over Internet Protocol (VoIP) telephone, typically provides access to a user by requiring the user to manually input some form of identification data, such as a user ID and a password. The identification data is typically associated with a profile of the user, which may include a particular configuration of settings for the shared device. For example, a profile may include the personalized settings of the user and settings which grant the user access to a particular set of features in the shared device. Therefore, once a user provides the identification data, the profile of the user can be set in the shared device by adjusting the settings in the shared device in accordance with the configuration of settings included in the profile. However, requiring the user of the shared device to recall and manually enter the abovementioned identification data each time the shared device is to be used can greatly inconvenience the user.

The known methods used to overcome the abovementioned difficulties associated with requiring the user to manually enter a user ID and password involve allowing the user to physically plug in a device representing a token into the shared device. In particular, one such known method involves the use of a USB device which can be plugged directly into a USB port that is provided on the shared device. The USB device can be associated with a particular user and can include the user's identification data as well as the profile of the user. However, the USB device can introduce significant drawbacks. For example, each user will typically be required to carry an assigned USB device with them at all times in order to gain access to the shared device, which can inconvenience the user since such USB devices can be bulky. Moreover, the USB port provided on the shared device typically includes an exposed metal pad, which can make the shared device more vulnerable to damage caused by electrostatic discharge (ESD) as well as increase the difficulty of passing an ESD test.

Thus, there is a strong need in the art for a system, which allows convenient and secure profile setting in a shared device.

SUMMARY OF THE INVENTION

There are provided systems and methods for secure profile setting in a shared device, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
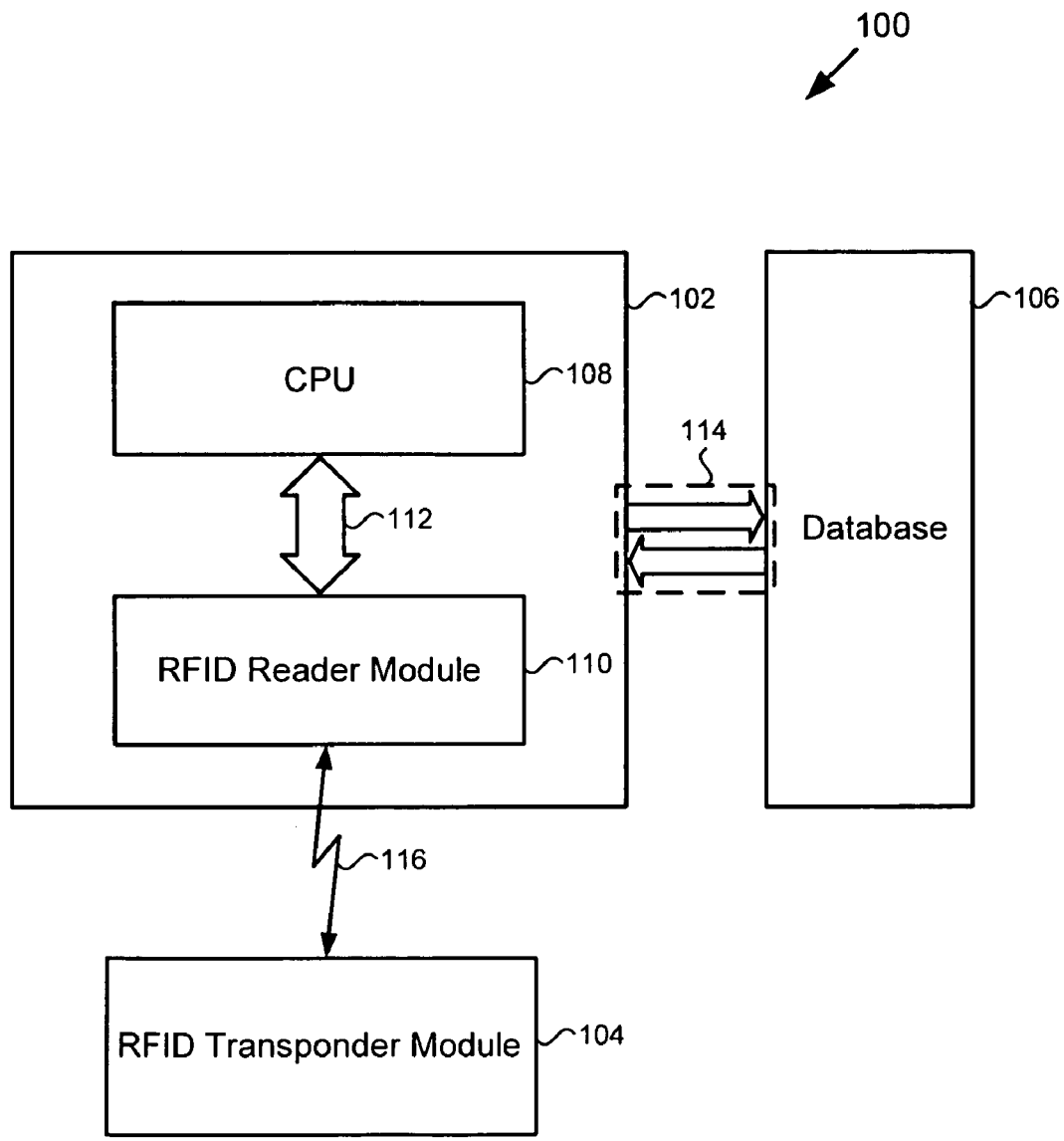
FIG. 1 is a block diagram illustrating a system for secure profile setting in a shared device, according to one embodiment of the present invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 shows a block diagram of an exemplary system for secure profile setting in a shared device in accordance with one embodiment of the invention. System 100 in FIG. 1 includes shared device 102, RFID transponder module 104, and database 106. Shared device 102 can be, for example, any device that be used and configured by multiple users, such as a VoIP telephone, a laptop computer, or a cellular telephone.

As shown in FIG. 1, shared device 102 includes central processing unit (CPU) 108 and radio frequency identification (RFID) reader module 110. As also shown in FIG. 1, CPU 108 can communicate with RFID reader module 110 via bus 112. RFID reader module 110 can be, for example, an RFID reader that is embedded in shared device 102. As also shown in FIG. 1, system 100 includes RFID transponder module 104, which can communicate with shared device 102 via RFID reader module 110 in a manner known in the art. For example, RFID transponder module 104 and RFID reader module 110 can establish a communication link between one another, such as communication link 116, using radio frequency signals.

As further shown in FIG. 1, system 100 includes database 106, which is in communication with shared device 102 via communication path 114. Communication path 114, for example, can be a physical connection, such as a bus, or a wired or wireless data link that enables communication over a network. Database 106, for example, can be a database that is accessible over a network. In one embodiment, shared device 102 can be configured to cache a copy of database 106 and to access the cached copy of database 106 locally. Database 106, for example, can include a number of profiles, where each profile includes a configuration of settings for shared device 102. The configuration of settings can include, for example, the personalized settings of the user and settings which grant the user access to a particular set of features in shared device 102. Accordingly, each profile in database 106 can correspond to a particular user of shared device 102.

RFID transponder module 104 in FIG. 1 can include, for example, a chip-based RFID tag capable of storing data and transmitting data to an RFID reader using radio frequency signals. For example, RFID transponder module 104 can store authentication data that can be used by shared device 102 to establish the identity of a user, such as a number associated with a particular user (e.g., an employee number) or biometric authentication data associated with a particular user, such as a fingerprint template or a voice template. It should be noted that although FIG. 1 depicts a single RFID transponder module (i.e., RFID transponder module 104), system 100 can include additional RFID transponder modules. Moreover, system 100 can include additional shared devices. Thus, in exemplary system 100, each user of shared device 102 can be associated with a particular RFID transponder module, such as RFID transponder module 104.

Figure 2:
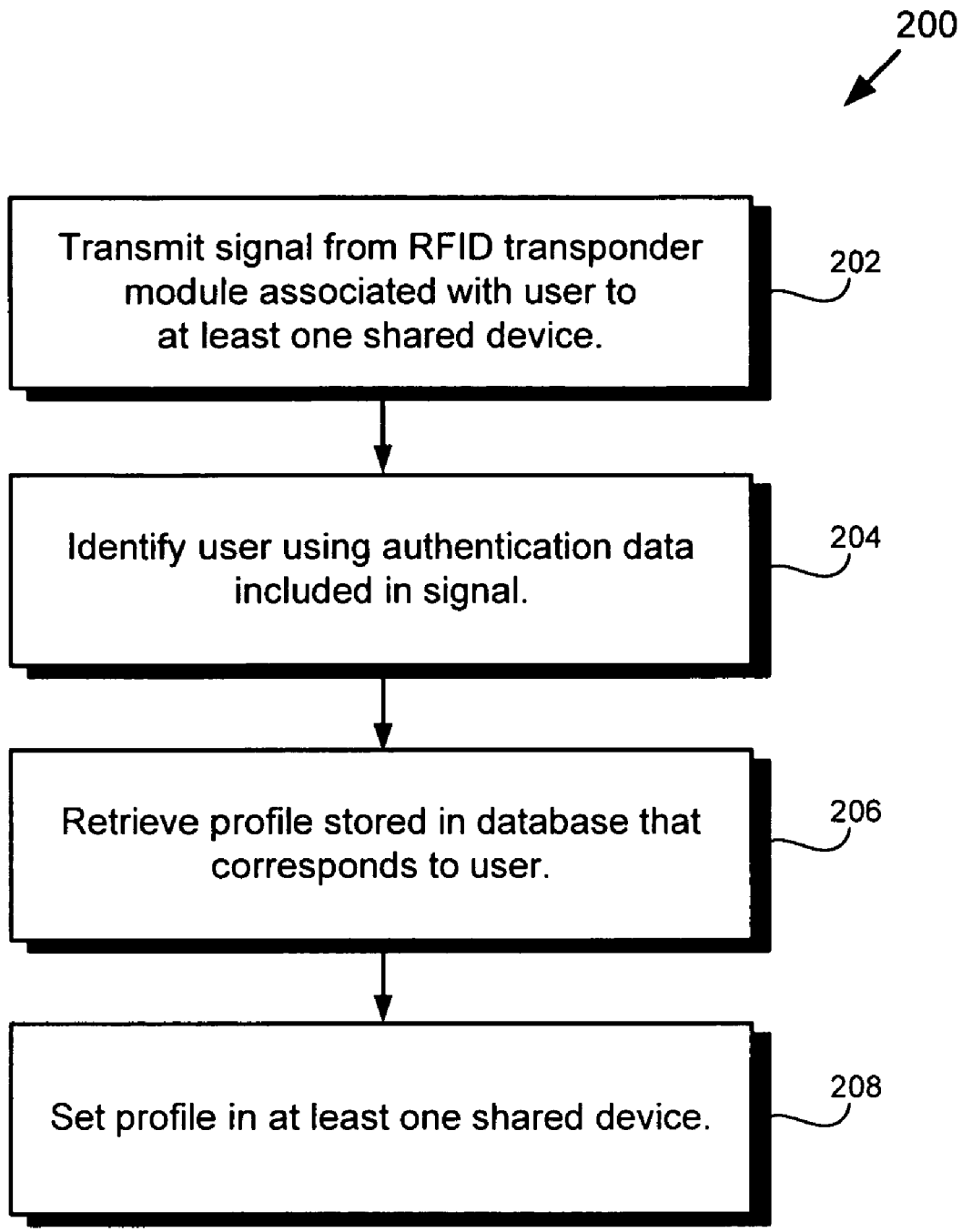
FIG. 2 is a flow diagram illustrating a method for secure profile setting of at least one shared device, according to one embodiment of the present invention.

FIG. 2 illustrates flowchart 200 for performing an exemplary method for secure profile setting in a shared device in accordance with one embodiment of the present invention. As shown in FIG. 2, at step 202 of flowchart 200, the method for secure profile setting can be initiated by a signal transmitted from RFID transponder module 104 in FIG. 1, which can be associated with a user of shared device 102. For example, the user may place RFID transponder module 104 within a suitable range of shared device 102 to allow communication link 116 to be established between RFID transponder module 104 and RFID reader module 110 embedded in shared device 102. Communication link 116 can be established, for example, when RFID transponder module 104 receives adequate incoming radio frequency signals from RFID reader module 110 which then enables RFID transponder module 104 to transmit a signal back to RFID reader module 110. Thus, in one exemplary embodiment of the invention, shared device 102 in FIG. 1 can be a VoIP telephone having an embedded RFID reader module. In such an embodiment, a user can place the associated RFID transponder module within a suitable range of the VoIP telephone to allow a communication link to be established between the RFID transponder module and the embedded RFID reader module using radio frequency signals.

As shown in FIG. 2, at step 204 of flowchart 200, the signal transmitted by RFID transponder module 104 to RFID reader module 110 is used by shared device 102 to identify the user. As previously discussed, RFID transponder module 104 can include a chip-based RFID tag that is capable of storing data and transmitting the stored data. Thus, the signal transmitted by RFID transponder module 110 can include various types of authentication data that can be associated with the user, such as biometric authentication data. For example, RFID transponder module 104 can include biometric authentication data associated with a particular user, such as a fingerprint template or a voice template. Therefore, once RFID reader module 110 acquires the authentication data from RFID transponder module 104, RFID reader module 110 can provide the authentication data to CPU 108 via bus 112 to properly identify the user. For example, the user may be prompted by shared device 102 to provide a voice sample, which can be achieved by having the user speak into a microphone coupled to shared device 102 (not shown in FIG. 1). The voice sample can then be compared to the voice template acquired from RFID transponder module 104, and if the voice sample matches the voice template, the user can be positively identified by shared device 102.

As shown in FIG. 2, at step 206 of flowchart 200, shared device 102 retrieves a profile stored in database 106 that corresponds to the user identified in step 204. As previously mentioned, database 106 can include a number of profiles, such that each profile corresponds to a particular user. Therefore, once the identity of a user is established in step 204, shared device 102 can proceed to query database 106, for example, for the profile corresponding to the identified user and can retrieve the profile via communication path 114.

As shown in FIG. 2, at step 208 of flowchart 200, the profile retrieved in step 206 is set in shared device 102 by determining from the profile, for example, a configuration of settings for shared device 102. The configuration of settings can include, for example, the personalized settings of the user and other settings which can grant the user access to a particular set of features in shared device 102. For example, in the embodiment of the invention where shared device 102 is a VoIP telephone, a user's profile may require that the volume on the VoIP telephone be set to a particular level and to bill calls placed by the user to a particular account. Thus, once the configuration of settings are determined from the profile, the profile can be set in shared device 102 by adjusting the settings in shared device 102 in accordance with the configuration of settings included in the user's profile.

Figure 3:
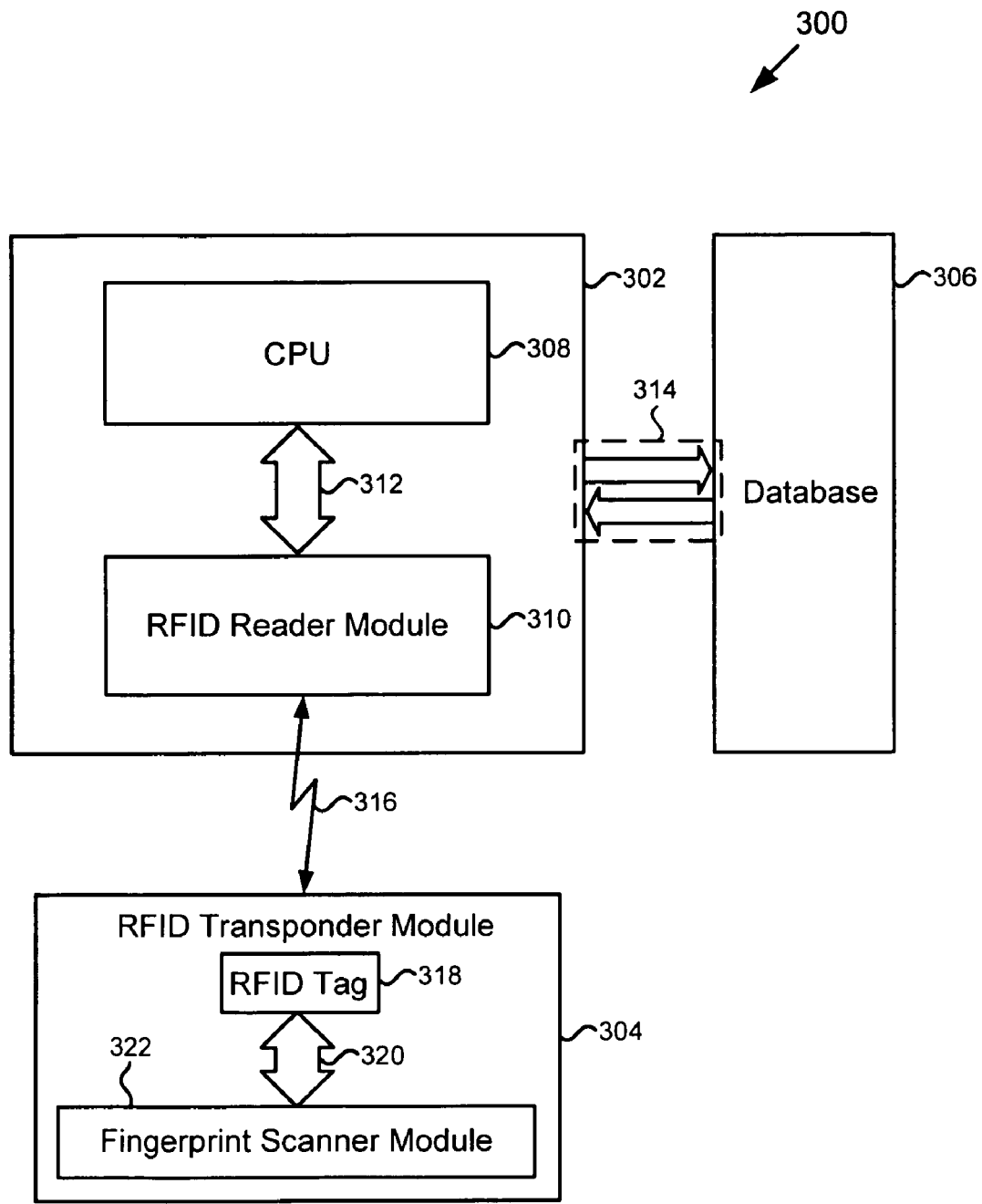
FIG. 3 is a block diagram illustrating a system for secure profile setting in a shared device, according to one embodiment of the present invention.

FIG. 3 shows a block diagram of an exemplary system for secure profile setting in a shared device in accordance with one embodiment of the invention. System 300 in FIG. 3 includes shared device 302, which includes CPU 308, RFID reader module 310, and bus 312. System 300 further includes database 306 and communication path 314. Shared device 302, CPU 308, RFID reader module 310, bus 312, database 306, and communication path 314 in FIG. 3 correspond to shared device 102, CPU 108, RFID reader module 110, bus 112, database 106, and communication path 114 in FIG. 1, respectively. System 300 further includes RFID transponder module 304.

As shown in FIG. 3, RFID transponder module 304 includes RFID tag 318 and fingerprint scanner module 322. Fingerprint scanner module 322 can communicate with RFID tag 318 via bus 320. Fingerprint scanner module 322 can include a fingerprint scanner which can be used to acquire fingerprint data directly from the user. Fingerprint scanner module 322 can further include a microchip which can compare the acquired fingerprint data to a fingerprint template stored in RFID tag 318 to determine if there is a match, in which case the user can be positively identified as the person associated with RFID transponder module 304. For example, RFID transponder module 304 can be configured to transmit a signal to RFID reader module 310 only if the acquired fingerprint data matches the fingerprint template stored in RFID tag 318. Thus, the signal can include identification data, such as a name or an employee number of the user, which can allow shared device 302 to establish the identity of the user and to eventually grant the user access to shared device 302.

In another embodiment, the abovementioned microchip can be included in RFID reader module 310. In such an embodiment, RFID transponder module 304 can be configured to transmit a signal to RFID reader module 310 that includes both the acquired fingerprint data and the fingerprint template stored in RFID tag 318. As such, the acquired fingerprint data and the fingerprint template can be compared using the microchip included in RFID module 304 to determine if there is a match, in which case the user can be positively identified. Thus, a non-authorized user whose fingerprint data does not match the fingerprint template stored in the RFID tag of a particular RFID transponder module cannot gain access to the shared device.

Figure 4:
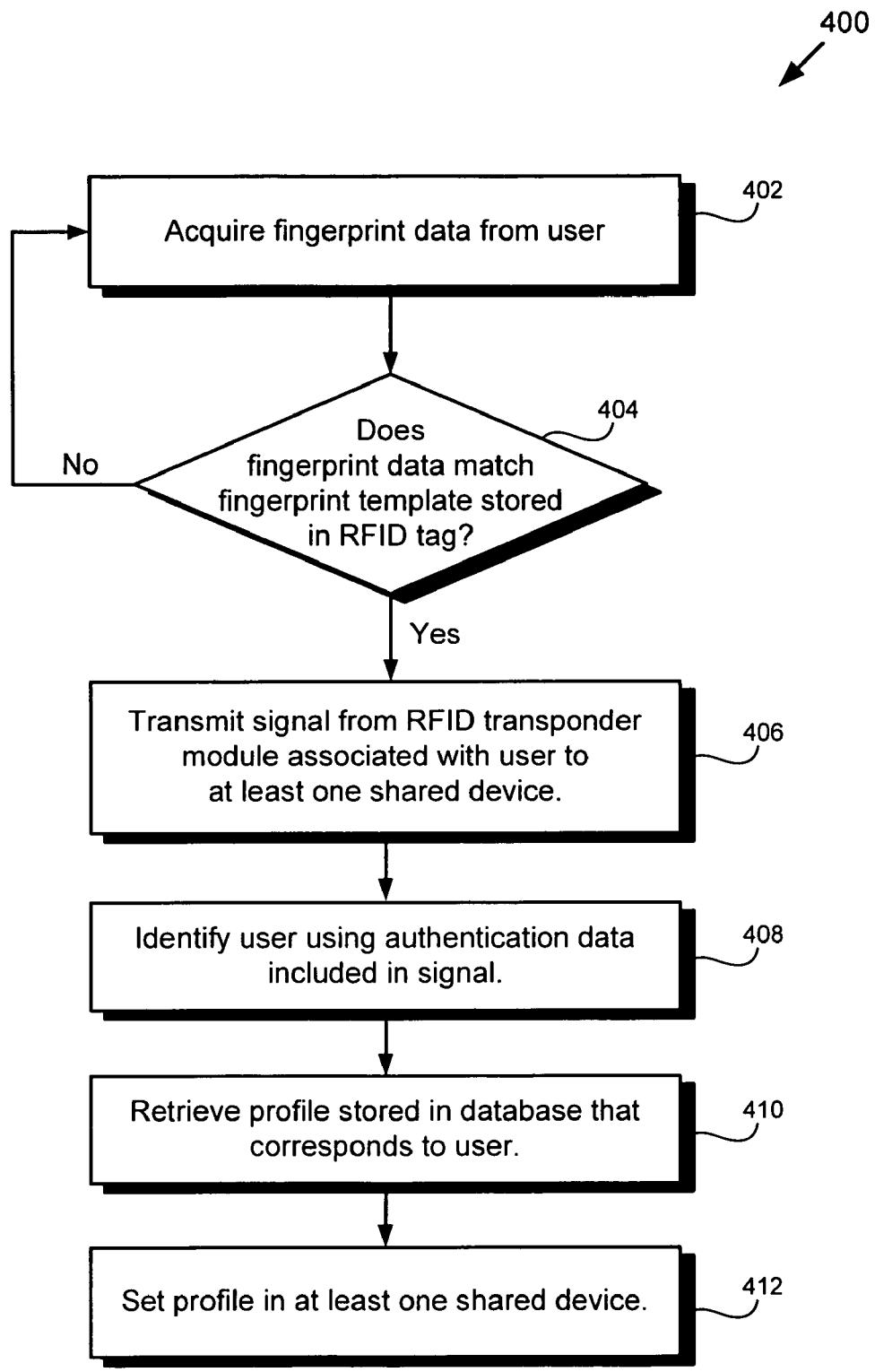
FIG. 4 is a flow diagram illustrating a method for secure profile setting of at least one shared device, according to one embodiment of the present invention.

FIG. 4 illustrates flowchart 400 for performing an exemplary method for secure profile setting in a shared device in accordance with one embodiment of the present invention. As shown in FIG. 4, at step 402 of flowchart 400, the method for secure profile setting can be initiated by acquiring the user's fingerprint data using fingerprint scanner module 322 included in RFID transponder module 304. Thereafter, at decision step 404, the fingerprint data is compared to the fingerprint template stored in RFID tag 318 to determine if there is a match. If the there is no match, step 402 can be repeated. If there is a match, then at step 406, a signal is transmitted from RFID transponder module 304 to shared device 302. For example, the user may place RFID transponder module 304 within a suitable range of shared device 302 to allow communication link 316 to be established between RFID transponder module 304 and RFID reader module 310 embedded in shared device 302. Communication link 316 can be established, for example, when RFID transponder module 304 receives adequate incoming radio frequency signals from RFID reader module 310 which then enables RFID transponder module 304 to transmit a signal back to RFID reader module 310.

As shown in FIG. 4, at step 408 of flowchart 400, the signal transmitted by RFID transponder module 304 to RFID reader module 310 is used by shared device 302 to identify the user. Since RFID tag 318 can be a chip-based RFID tag that is capable of storing data and transmitting the stored data, the signal transmitted by RFID transponder module 304 can include various types of authentication data that can be associated with the user, such as a name of the user, an employee number, or biometric authentication data. Therefore, once RFID reader module 310 acquires the authentication data from RFID transponder module 304, RFID reader module 310 can provide the authentication data to CPU 308 via bus 312 to properly identify the user.

As shown in FIG. 4, at step 410 of flowchart 400, shared device 302 retrieves a profile stored in database 306 that corresponds to the user identified in step 408. As previously mentioned, database 306 can include a number of profiles, such that each profile corresponds to a particular user. Therefore, once the identity of a user is established in step 408, shared device 302 can proceed to query database 306, for example, for the profile corresponding to the identified user and can retrieve the profile via communication path 314.

As shown in FIG. 4, at step 412 of flowchart 400, the profile retrieved in step 410 is set in shared device 302 by determining from the profile, for example, a configuration of settings for shared device 302. The configuration of settings can include, for example, the personalized settings of the user and other settings which can grant the user access to a particular set of features in shared device 302. For example, in the embodiment of the invention where shared device 302 is a VoIP telephone, a user's profile may require that the volume on the VoIP telephone be set to a particular level and to bill calls placed by the user to a particular account. Thus, once the configuration of settings are determined from the profile, the profile can be set in shared device 302 by adjusting the settings in shared device 302 in accordance with the configuration of settings included in the user's profile.

Therefore, the present invention can be implemented in various shared devices where a user's profile can be set in the shared device. For example, the invention can be implemented in a corporate cellular telephone which can be shared among a number of associates in a corporation or a telecommunication terminal, such as a VoIP telephone terminal, that is coupled to a network. The invention can also be implemented in a computer terminal that is coupled to a network as well as a laptop computer or other portable electronic device. Furthermore, the invention can be implemented in a motor vehicle, for example, by allowing a user to set a profile in the motor vehicle which includes the user's seating and mirror positions or other types of settings preferred by a user.

Thus, the invention enables a user to set a profile in a shared device by placing an RFID transponder module (e.g., RFID transponder module 104) associated with the user within a suitable range of the shared device to establish a communication link (e.g., communication link 116) between the RFID transponder module and the RFID reader module embedded in the shared device. Moreover, the abovementioned exemplary security features of the invention, such as the fingerprint scanner that may be included in the RFID transponder module, can provide secure profile setting in the shared device by ensuring that the user of the shared device is authorized to use the shared device.

In contrast to the conventional system including the USB device discussed above, the present invention can be implemented without inconveniencing the user of the shared device. For example, since the RFID transponder module of the present invention can include a small RFID tag, the RFID transponder module can be conveniently placed in an identification badge or other small object which a user, for example, is already required to carry. Consequently, the present invention advantageously avoids requiring the user to carry additional bulky devices, such as a USB device.

In further contrast to the conventional system including the USB device, the present invention's ability to set a profile in a shared device by the transmission of data between an RFID transponder module and an RFID reader module embedded in the shared device can advantageously maintain the electrical isolation of the shared device. More specifically, since the present invention does not require additional ports to be included on the shared device, such as a USB port, the present invention does not introduce any exposed metal pads which can increase the shared device's vulnerability to damage caused by ESD and which can increase the difficulty of passing an ESD test.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for secure profile setting, said system comprising:
  at least one shared Voice over IP (VoIP) telephone;
  an RFID reader module embedded in said at least one shared VoIP telephone;
  a database in communication with said at least one shared VoIP telephone;
  an RFID transponder module, wherein said RFID transponder module is associated with a user of said at least one shared VoIP telephone using said user's biometric data stored in said RFID transponder module, and is configured to transmit a signal to said RFID reader module;
  wherein said at least one shared VoIP telephone is configured to identify said user in response to said RFID reader module receiving said signal, wherein said at least one shared VoIP telephone is further configured to retrieve a profile corresponding to said user, in response to being identified by said at least one shared VoIP telephone, from said database, and wherein said at least one shared VoIP telephone is further configured to set said profile, wherein said profile includes personalized settings of said at least one shared VoIP telephone by said user.

2. The system of claim 1 wherein said RFID transponder module is configured to acquire biometric data, including fingerprint data from said user and to transmit said signal if said fingerprint data matches a fingerprint template of said user's biometric data stored in said RFID transponder module.

3. The system of claim 1 wherein said RFID transponder module is configured to acquire biometric data, including fingerprint data from said user and to include said fingerprint data and a fingerprint template stored in said RFID transponder module in said signal.

4. The system of claim 1 wherein said at least one shared VoIP telephone identifies said user by matching a voice template of said user's biometric data stored in said transponder to a voice of said user.

5. The system of claim 1 wherein said RFID transponder module includes a fingerprint scanner.

6. The system of claim 1 wherein said personalized settings of said at least one shared VoIP telephone by said user includes a volume setting of said at least one shared VoIP telephone.

7. The system of claim 1 wherein said at least one shared VoIP telephone is a cellular telephone.

8. A method for secure profile setting of at least one shared Voice over IP (VoIP) telephone, said at least one shared VoIP telephone having an embedded RFID reader module and being in communication with a database, said method comprising:
receiving, by said at least one shared VoIP telephone, a signal from an RFID transponder module associated with a user of said at least one shared VoIP telephone using said user's biometric data stored in said RFID transponder module;
identifying said user using said signal in response to said receiving said signal;
retrieving a profile of said user from said database by said at least one VoIP telephone in response to identifying said user;
setting said profile in said at least one shared VoIP telephone, wherein said profile includes personalized settings of said at least one shared VoIP telephone by said user.

9. The system of claim 8 wherein said RFID transponder module is configured to acquire biometric data, including fingerprint data, from said user and to include said fingerprint data and a fingerprint template of said user's biometric data stored in said RFID transponder module in said signal.

10. The method of claim 8 wherein said RFID transponder module is configured to acquire biometric data, including fingerprint data, from said user, said method further comprises matching said fingerprint data to a fingerprint template stored in said RFID transponder module.

11. The method of claim 10 wherein said transmitting is performed if said fingerprint data matches said finger print template.

12. The method of claim 8 wherein said at least one shared VoIP telephone identifies said user by matching a voice template of said user's biometric data stored in said RFID transponder module to a voice sample of said user.

13. The method of claim 8 wherein said personalized settings of said at least one shared VoIP telephone by said user includes a volume setting of said at least one shared VoIP telephone.

14. The method of claim 8 wherein said at least one shared VoIP telephone is a cellular telephone.

* * * * *